US009170697B2

(12) United States Patent
Liao et al.

(10) Patent No.: US 9,170,697 B2
(45) Date of Patent: Oct. 27, 2015

(54) TOUCH UNIT AND FLAT PANEL DISPLAY

(71) Applicant: HannsTouch Solution Incorporated, Tainan (TW)

(72) Inventors: Sian-Zong Liao, Taichung (TW); Han-Ming Chen, Tainan (TW)

(73) Assignee: HannsTouch Solution Incorporated, Neihu Dist., Taipei (TW)

( * ) Notice: Subject to any disclaimer, the term of this patent is extended or adjusted under 35 U.S.C. 154(b) by 66 days.

(21) Appl. No.: 14/260,259

(22) Filed: Apr. 23, 2014

(65) Prior Publication Data
US 2015/0049047 A1  Feb. 19, 2015

(30) Foreign Application Priority Data

Aug. 15, 2013  (TW) ............................. 102129308 U

(51) Int. Cl.
*G06F 3/044* (2006.01)

(52) U.S. Cl.
CPC ....................................... *G06F 3/044* (2013.01)

(58) Field of Classification Search
CPC .......... G06F 3/044; G06F 2203/04111; G06F 2203/04112; G09G 3/3611
See application file for complete search history.

(56) References Cited

U.S. PATENT DOCUMENTS

| | | | | |
|---|---|---|---|---|
| 8,792,062 B2* | 7/2014 | Hwang | ................... | G06F 3/044 178/18.01 |
| 2008/0062140 A1* | 3/2008 | Hotelling | ............ | G02F 1/13338 345/173 |
| 2010/0066650 A1* | 3/2010 | Lee | ..................... | G02F 1/13338 345/64 |
| 2010/0214262 A1* | 8/2010 | Ishizaki | .............. | G02F 1/13338 345/174 |
| 2010/0316851 A1* | 12/2010 | Hirai | ....................... | G06F 3/044 428/195.1 |
| 2011/0025635 A1* | 2/2011 | Lee | ........................ | G06F 1/3203 345/173 |
| 2012/0105381 A1* | 5/2012 | Lee | ........................ | G06F 3/0412 345/176 |
| 2012/0206403 A1* | 8/2012 | Wang | ................... | G02F 1/13338 345/174 |
| 2012/0218482 A1* | 8/2012 | Hwang | ................... | G06F 3/044 349/12 |
| 2012/0307185 A1* | 12/2012 | Wang | ................... | G02F 1/13338 349/106 |
| 2013/0135540 A1* | 5/2013 | Nam | .................. | G02F 1/136286 349/12 |
| 2013/0293792 A1* | 11/2013 | You | ......................... | G06F 3/044 349/12 |
| 2013/0335345 A1* | 12/2013 | Liu | ......................... | G06F 3/041 345/173 |
| 2013/0341651 A1* | 12/2013 | Kim | ..................... | H01L 31/0232 257/84 |
| 2014/0043247 A1* | 2/2014 | Singh | .................... | G06F 1/3218 345/173 |
| 2014/0145996 A1* | 5/2014 | Sugita | ..................... | G06F 3/044 345/173 |
| 2014/0160377 A1* | 6/2014 | Yamagishi | ............... | G06F 3/044 349/12 |
| 2014/0313442 A1* | 10/2014 | Misaki | ..................... | G06F 3/041 349/12 |
| 2015/0022501 A1* | 1/2015 | Kita | ..................... | G02F 1/13338 345/174 |
| 2015/0054803 A1* | 2/2015 | Yashiro | ................... | G06F 3/041 345/206 |
| 2015/0219971 A1* | 8/2015 | Tanaka | ................ | G02F 1/13338 349/12 |

* cited by examiner

*Primary Examiner* — Joe H Cheng
(74) *Attorney, Agent, or Firm* — Winston Hsu; Scott Margo

(57) ABSTRACT

In a flat panel display, two direction sensing electrodes, respectively representing an X-axis sensor and a Y-axis sensor, are disposed on both sides of a substrate of a color filter of the flat panel display. One direction sensing electrode is disposed in the black matrix on one side of the substrate and the other direction sensing electrode is disposed on the other side of the substrate locating farther from the black matrix. The configuration provides a much thinner dimension for the flat panel display with touch function while the touch function is less interfered by the display panel.

21 Claims, 8 Drawing Sheets

TOUCH UNIT AND FLAT PANEL DISPLAY

BACKGROUND OF THE INVENTION

1. Field of the Invention

The invention relates to a display, and more particularly, to a capacitance touch display.

2. Description of the Prior Art

Although touch display has developed with various technologies such as a capacitive type, a resistant type, and an optical type, the capacitive type touch technology becomes the mainstream in the field. On manufacture procedure regards, a capacitive type touch panel may be divided into G/G (out-cell), OGS (out-cell), In-cell, and On-cell structures, whereas the latter three are primary in the present applications.

In the aforementioned capacitive type structures, G/G structure is the first type structure of a conventional capacitive touch panel structure. The G/G type structure first configures the touch sensing unit on a glass as the substrate and a much stronger cover lens is further disposed on the touch sensing unit. Such structure has features of rigid hardness and low signal interference but it is also dissatisfactory due to its complicated manufacture procedure and larger thickness.

OGS structure is the second type structure which also disposes the touch sensing unit on a bottom side of the substrate while the other side of the substrate is exposed for direct touch by a user. Due to the OGS structure having one less glass than the GIG structure, and the glass of OGS structure is usually strengthened or tampered before cutting process. Accordingly, the hardness of the substrate in the OGS structure will be more fragile than the one that going through strengthened after being cutting process. Quality flaw may easily be occurred on such structure especially when applied on products subject to dropping or crushing like mobile phones or tablets. Also, compared with G/G structure, there has reliability problem, since in OGS structure a light resistance (for example BM) coating procedure is first carried out on the substrate and then a series of conductive pattern is formed on the light resistance and the substrate that is hard to control the conductive pattern sputtering quality.

In-cell structure is the third type structure, which is composed of the touch sensing unit between the color filter and the Thin-film-transistor layer (TFT layer) of the panel, and the fourth type structure, On-cell structure, is composed of the touch sensing unit on the color filter (CF). Both the two types of touch structure may be further protected by rigid cover lens on the panel module and easy for process . However, since the touch sensing unit is much closer to the TFT layer than the previous types, the TFT layer would have greater interference over the circuit-based touch sensing unit, with the In-cell structure of the third type suffering more from the interference than the On-cell structure of the fourth type. Moreover, when the In-cell structure or the On-cell structure is implemented for large-scale touch panel, the higher conducting line resistance together with the electrical interference will make it harder to determine the touch signals.

SUMMARY OF THE INVENTION

To solve the problems exist in the touch panel described, embodiments of the invention provide a touch unit and a flat panel display having such touch unit.

An embodiment of the invention provides a touch unit including a substrate, a black matrix, a first direction sensing electrode, a second direction sensing electrode, and a color filter layer. The substrate has a first surface and a second surface opposite to each other. The black matrix is disposed on the first surface of the substrate and a plurality of pixel areas is defined by the black matrix. The first direction sensing electrode is disposed on the black matrix or contained in the black matrix. The second direction sensing electrode is disposed on the second surface. The color filter layer includes a plurality of color filter units disposed in the plurality of pixel areas defined by the black matrix. The first direction sensing electrode is disposed between the substrate and the color filter layer.

Another embodiment of the invention provides a flat panel display including a display substrate, a touch unit, and a liquid crystal layer. The touch unit is disposed on the display substrate. The touch unit includes a substrate, a black matrix, a first direction sensing electrode, a second direction sensing electrode, and a color filter layer. The substrate has a first surface and a second surface opposite to each other. The black matrix is disposed on the first surface of the substrate and a plurality of pixel areas is defined by the black matrix. The first direction sensing electrode is disposed on the black matrix or contained in the black matrix. The second direction sensing electrode is disposed on the second surface. The color filter layer includes a plurality of color filter units disposed in the plurality of pixel areas defined by the black matrix. The liquid crystal layer is disposed between the touch unit and the display substrate.

In the embodiments of the invention, the first direction sensing electrode is a metallic electrode and the second direction sensing electrode is a transparent conductive electrode.

In the embodiments of the invention, the first direction sensing electrode is disposed on the black matrix and includes a plurality of first electrode strips aligning along a first direction and parallel with one another. Every two adjacent first electrode strips are separated by a gap with a first distance and each first electrode strip is a meshed structure. The plurality of first electrode strips is composed of a plurality of metal wires with a metal mesh structure. The width of each metal wire is less than or equal to the line width of the black matrix where the metal wire is located, whereby the width of each metal wire is between 2 μm and 8 μm. Each first electrode strip has the width that covers at least a row of pixel areas. The second direction sensing electrode includes a plurality of second electrode strips aligning along a second direction and parallel with one another. Every two adjacent second electrode strips are separated with a second distance.

In the embodiments of the invention, the first direction sensing electrode is contained in the black matrix. The black matrix includes a first anti-reflection layer and a metallic layer. The first anti-reflection layer is disposed between the first surface and the metallic layer, and the first direction sensing electrode is formed by the metallic layer. The touch unit further includes a second anti-reflection layer disposed between the first anti-reflection layer and the metallic layer. The first anti-reflection layer is an oxide layer and the second anti-reflection layer is a nitride layer. A plurality of first electrode strips is composed of the black matrix. The plurality of first electrode strips align along a first direction and are parallel with one another and each first electrode strip is a meshed structure. Every two adjacent first electrode strips are separated by a gap and a color filter unit for filtering at least two colors is disposed on the gap.

Compared with conventional in-cell or on-cell SITO structure, a single ITO structure requiring configuration of bridge insulation layer, the touch unit in the embodiments of the invention disposes two direction sensing electrodes, respectively representing an X-axis sensor and a Y-axis sensor, on both sides of a substrate of a color filter in the flat panel display. The embodiments of the invention does not need the configuration of the bridge insulation layer and the X-axis sensor and the Y-axis sensor may be made of different materials such as an opaque conductive material (metal material for example) and transparent conductive material (an ITO for example). Also, one direction sensing electrode is disposed in/on the black matrix on one side of the substrate and the other direction sensing electrode is disposed on the other side of the substrate locating farther from the black matrix. The configuration provides a much less thickness for the flat panel display with touch function while the touch function is less interfered by the display panel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical connection. Thus, if a first device is coupled to a second device, that connection may be through a direct electrical connection, or through an indirect electrical connection via other devices and connections.

Figure 1:
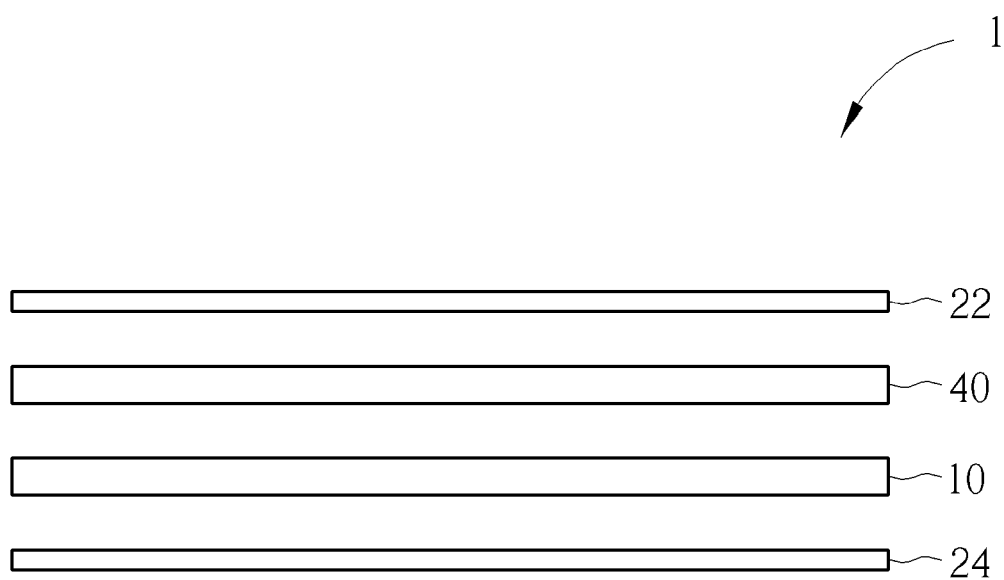
FIG. 1 is a schematic diagram showing side view of parts of a flat panel display according to the invention.

Please refer to FIG. 1. FIG. 1 is a schematic diagram showing side view of parts of a flat panel display according to the invention. A flat panel display 1 is provided here as a display with touch functions and includes a display substrate 10, a touch unit 40, a first polarizer 22, and a second polarizer 24. A liquid crystal layer, which is not shown in FIG. 1, is further disposed between the display substrate 10 and the touch unit 40. The display substrate 10 contains pixel drivers such as the thin-film-transistor (TFT) and the touch unit 40 is provided as a touch color filter disposed on the display substrate 10 and the first polarizer 22 is disposed on the touch unit 40. A cover lens, which is not illustrated, may be further disposed on the first polarizer 22. The second polarizer 24 is disposed under the display substrate 10 with a backlight module and other necessary components disposed underneath. For illustration and description brevity, only some components are illustrated in FIG. 1.

Figure 2:
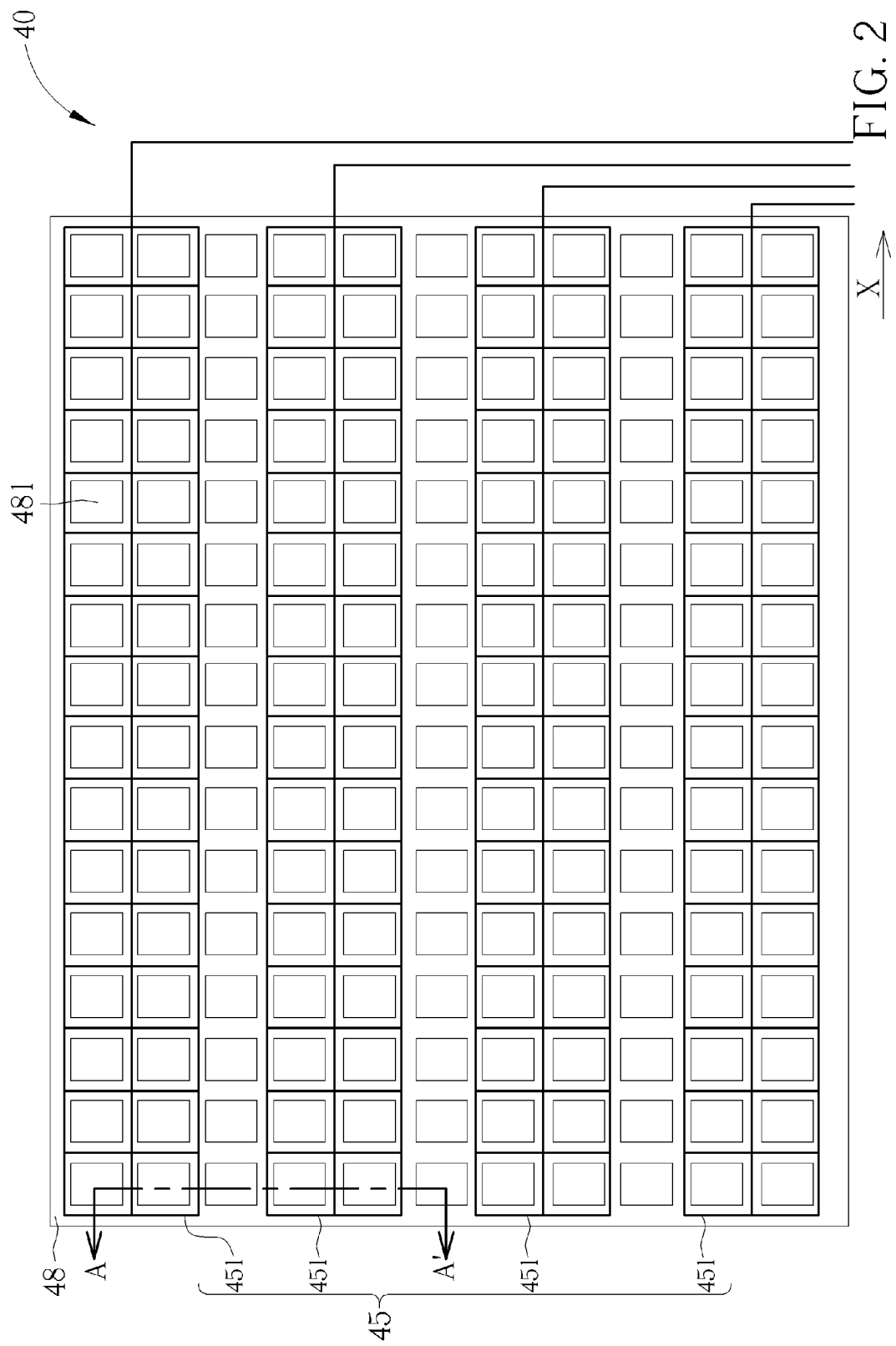
FIG. 2 is a schematic diagram of a first embodiment showing a first surface's top view of the touch unit as a color filter.
Figure 3:
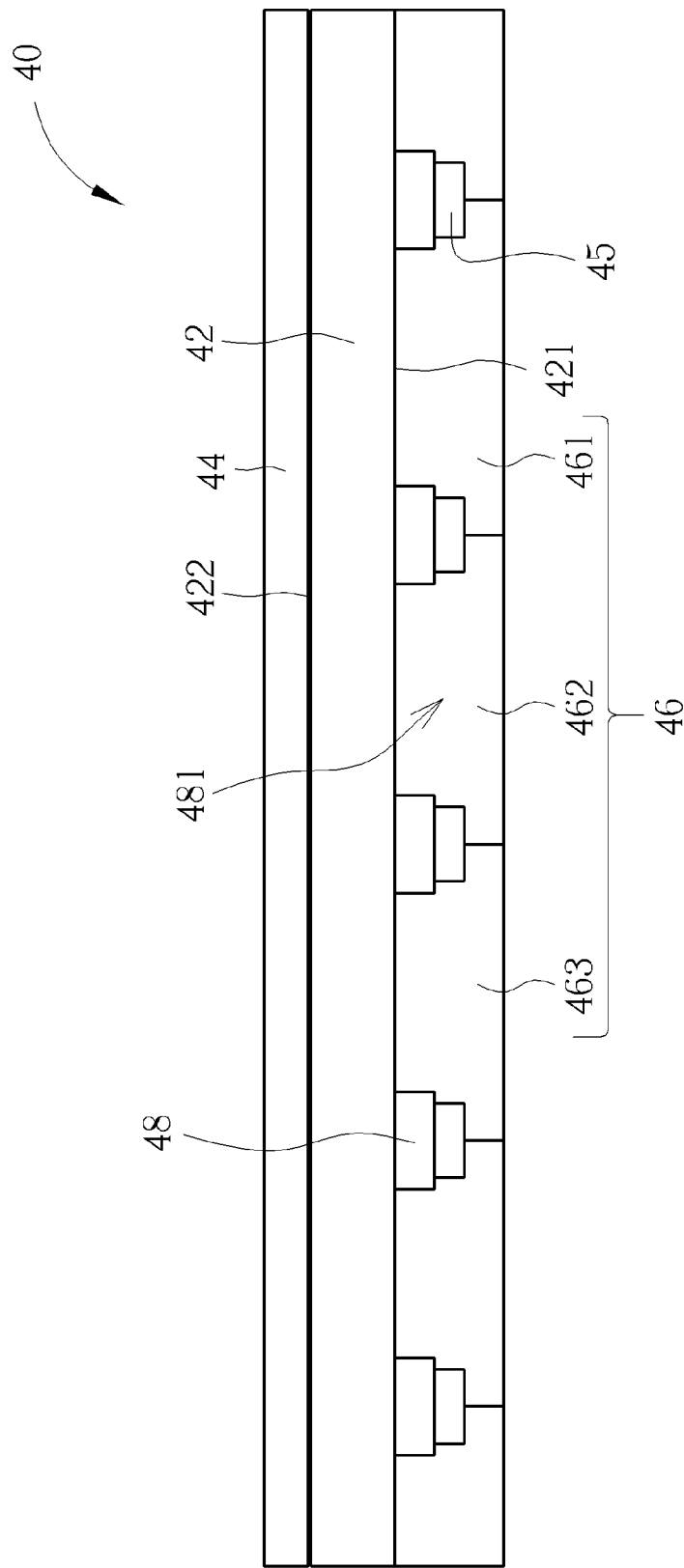
FIG. 3 is a schematic diagram of the touch unit's cross-section view in AA' line in FIG. 2.

Please refer to FIG. 2 and FIG. 3. FIG. 2 is a schematic diagram of a first embodiment showing a first surface's top view of the touch unit as a color filter and FIG. 3 is a schematic diagram of the touch unit's cross-section view in AA' line in FIG. 2. Regarding the first embodiment, the touch unit 40 includes a substrate 42 having a first surface 421 and a second surface 422 opposite to each other. The first surface 421 faces the display substrate 10 and the first polarizer 22 and the cover lens are disposed on the second surface 422 of the substrate 42. A black matrix 48, which is nonconductive in this embodiment, is disposed on the first surface 421 of the substrate 42. A plurality of pixel areas 481 is defined by the black matrix 48. A color filter layer 46 having a plurality of color filter units 461, 462, 463 is further separately disposed in the pixel areas 481 of the black matrix 48. More specifically, the color filter units 461, 462, 463 of the color filter layer 46 are provided with different colors. For example, the color filter unit 461 may be a red color filter unit, the color filter unit 462 may be a green color filter unit, and the color filter unit 463 may be a blue color filter unit. Generally, a common electrode layer (not illustrated), which is used for driving liquid crystals in the liquid crystal layer between the display substrate 10 and the touch unit 40 to rotate, may be further disposed under the color filter layer 46.

The touch unit 40 in the embodiments of the invention is provided with configuration of direction sensing electrodes, which are needed to fulfill the touch sensing function, at both sides of the color filter respectively. Specifically, the touch unit 40 includes a first direction sensing electrode 45 and a second direction sensing electrode 44, both partially illustrated in the figures. The first direction sensing electrode 45 is a metallic electrode disposed on the black matrix 48 on the first surface 421, whereas the second direction sensing electrode 44 is a transparent conductive electrode, such as an Indium Tin Oxide (ITO) layer, disposed on the second surface 422 of the substrate 42. An anti-reflection layer, not shown in the figures, may also be disposed between the black matrix 48 and the first surface 421 or between the black matrix 48 and the first direction sensing electrode 45 for providing better opacity for the black matrix 48. It should be noted that in the embodiment of FIG. 2, the first direction sensing electrode 45 includes a plurality of first electrode strips 451, each having a plurality of parallel metal wires, aligning along direction X, that form into a meshed structure. Every two adjacent first electrode strips 451 are separated by a gap with a first distance. The first distance is at least equal to or larger than the width of a pixel. These meshed metal wires are formed along the matrix structure of the black matrix 48. Preferably, the plurality of first electrode strips 451 is metallic meshed structure formed by a plurality of metal wires and the width of each metal wire is less than or equal to the line width of the black matrix 48 where the metal wire is located. Practically, the width of each metal wire is between, but not limited to, 2 μm and 8 μm. Since the resolution of a pixel is generally greater than that of the touch unit 40, each first electrode strip 451 of the first direction sensing electrode 45 has the width that covers at least one or more rows of pixel areas 481. Illustratively, two rows of pixel areas 481 are covered in FIG. 2.

Figure 4:
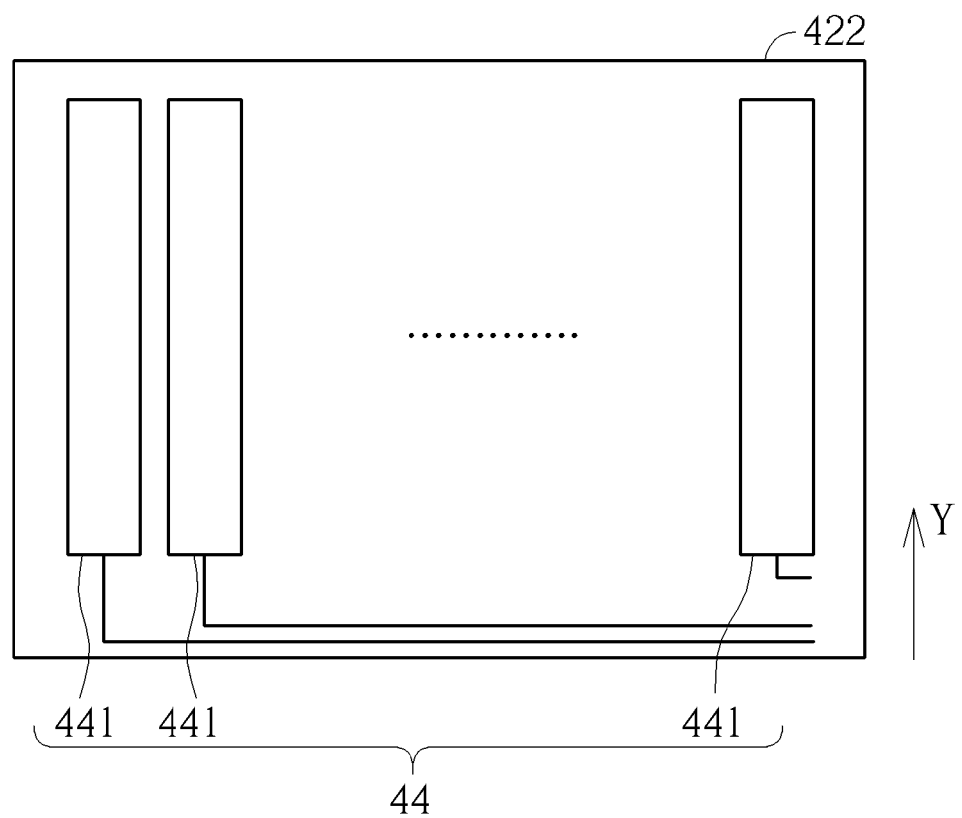
FIG. 4 is a schematic diagram showing a second surface's top view of the touch unit.

Please refer to FIG. 4. FIG. 4 is a schematic diagram showing a second surface's top view of the touch unit. The second direction sensing electrode 44 on the second surface 422 of the substrate 42 also includes a plurality of second electrode strips 441 aligning along direction Y and parallel with one another. Every two adjacent second electrode strips 441 are separated at a second distance. FIG. 2 and FIG. 4 show that the first direction sensing electrode 45 has orientation along direction X and the second direction sensing electrode 44 on the second surface 422 of the substrate 42 has orientation along direction Y. Therefore, the first direction sensing electrode 45 and the second direction sensing electrode 44 on both sides of the substrate 42 represent X-axis electrode and Y-axis electrode orthogonal to each other. It should be noted that in this embodiment, the second direction sensing electrode 44 is made of transparent conductive layer such as an Indium Tin Oxide (ITO) layer and each second electrode strip 441 may be configured as a sheet structure.

Figure 5:
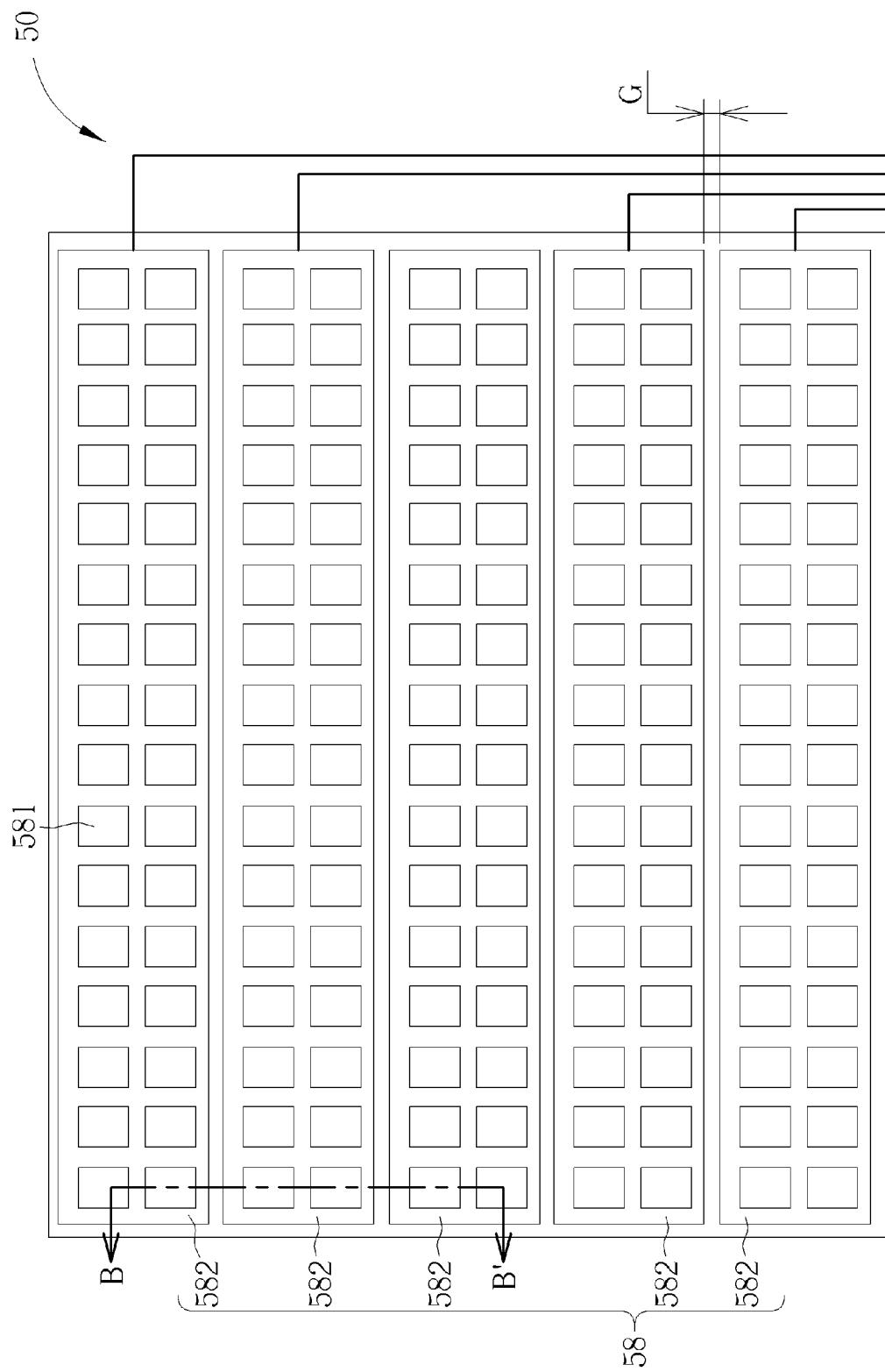
FIG. 5 is a schematic diagram of a second embodiment showing a first surface's top view of the touch unit as a color filter.
Figure 6:
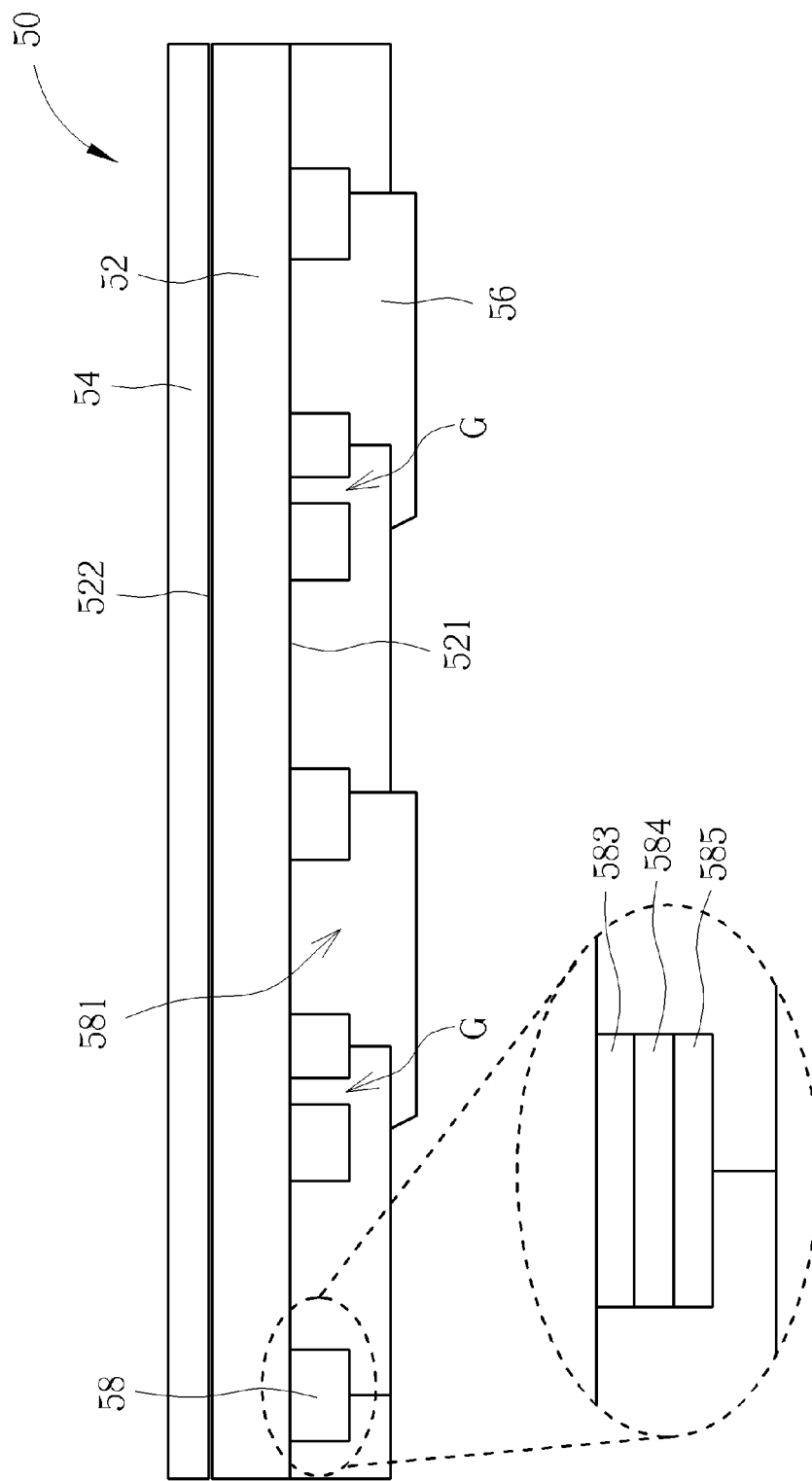
FIG. 6 is a schematic diagram of the touch unit's cross-section view in BB' line in FIG. 5.

Please refer to FIG. 5 and FIG. 6. FIG. 5 is a schematic diagram of a second embodiment showing a first surface's top view of the touch unit as a color filter and FIG. 6 is a schematic diagram of the touch unit's cross-section view in BB' line in FIG. 5. In the second embodiment, a conductive black matrix 58 is disposed on a first surface 521 of a substrate 52 of a touch unit 50. The black matrix 58 is an opaque metallic layer that can be also implemented as the first direction sensing electrode 45 in the first embodiment in FIG. 2. Likewise, the black matrix 58 defines a plurality of pixel areas 581 and a color filter layer 56 is further formed thereon. In FIG. 6, the black matrix 58 may include an oxide layer 583, a nitride layer 584, and a metallic layer 585. The oxide layer 583 (as a first anti-reflection layer) and the nitride layer 584 (as a second anti-reflection layer) are added to provide better opacity and anti-reflectivity for suppressing the occurrence of reflection due to the metallic layer 585. Additionally, the metallic layer 585 may be composed by metals such as chrome, molybdenum, silver, boron, copper, or aluminum. It should also be noted that for the embodiment in FIG. 5, the black matrix 58 as the first direction sensing electrode also includes a plurality of first electrode strips 582, each having a plurality of parallel metal wires, aligning along direction X, that form into a meshed structure, that is, contrary to the first embodiment, the first electrode strips 582 in the second embodiment are contained/formed in the black matrix 58. Every two adjacent first electrode strips 582 are separated by a gap G so that the first electrode strips 582 have no electrical contact with one another. Now that there might be light leakage in the gap G between the first electrode strips 582, a color filter unit for filtering at least two colors or two color filter units for filtering two different colors, such as a red filter and a green filter, as shown in FIG. 6, may be disposed overlapping the gap G. In another embodiment, disposing color filter unit(s) for filtering three different colors overlapping the gap G for better opacity may be an alternative implementation. As described earlier, since the resolution of a pixel is generally greater than that of the touch unit, each first electrode strip 582 has the width that covers at least one or more rows of pixel areas 581. Illustratively, two rows of pixel areas 581 are covered in FIG. 6.

FIG. 5 shows that the first electrode strips 582 of the first direction sensing electrode has orientation along direction X and the second direction sensing electrode 54 on the second surface 522 of the substrate 52 has orientation along direction Y, which is similar as the first embodiment in FIG. 4.

Figure 7:
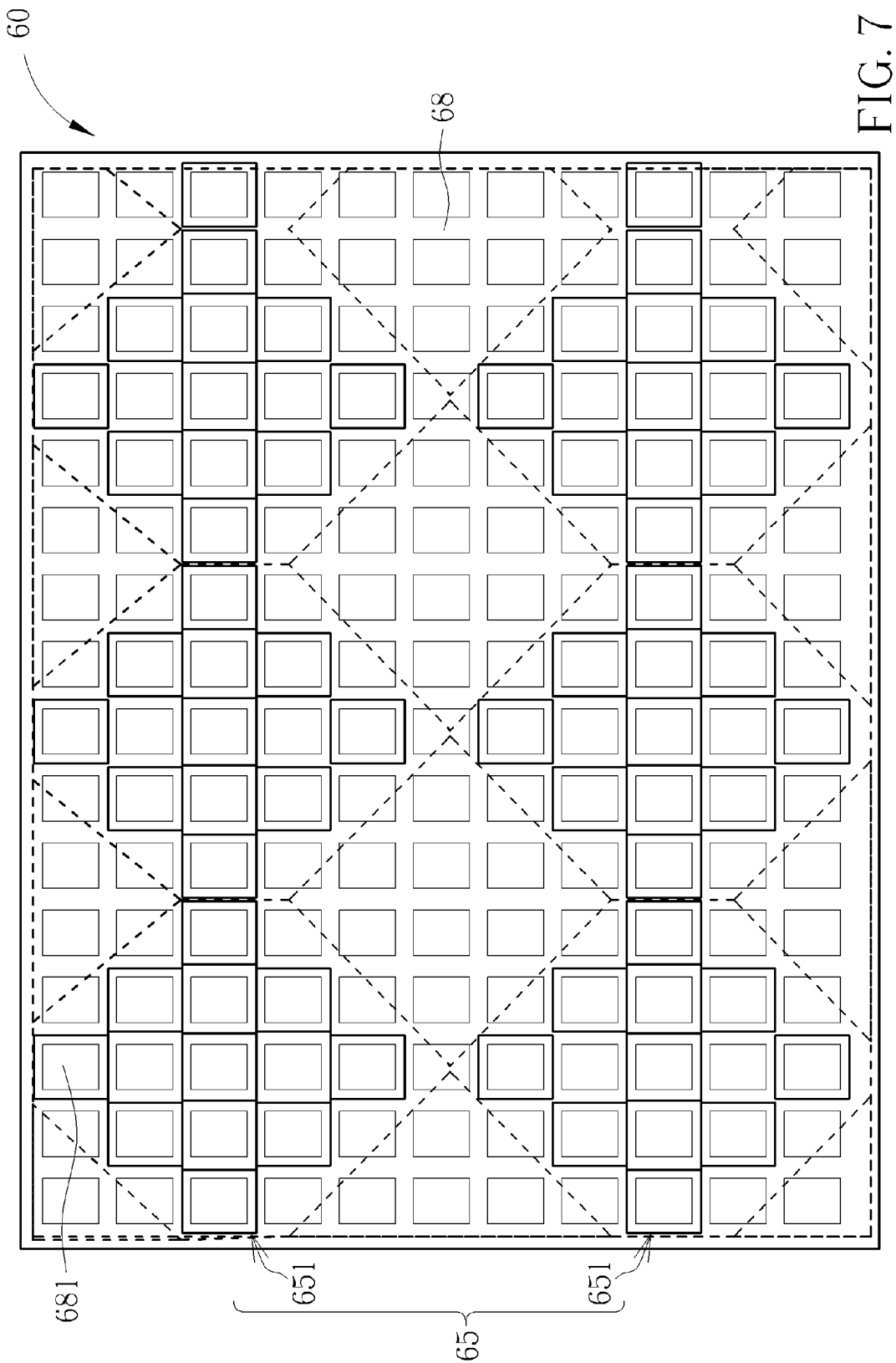
FIG. 7 is a schematic diagram of a third embodiment showing a first surface's top view of the touch unit as a color filter.
Figure 8:
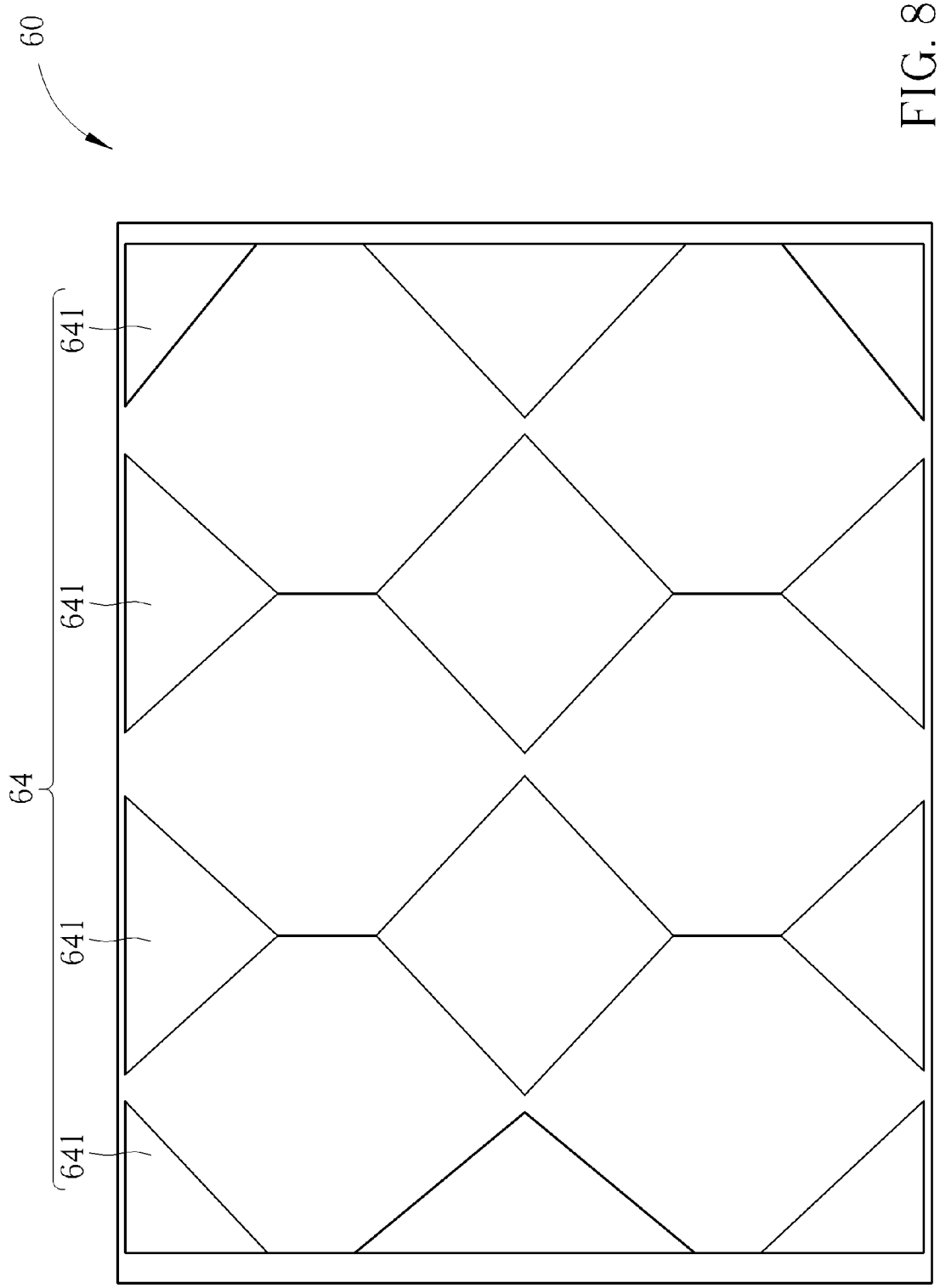
FIG. 8 is a schematic diagram showing a second surface's top view of the touch unit of the third embodiment.

Please refer to FIG. 7 and FIG. 8. FIG. 7 is a schematic diagram of a third embodiment showing a first surface's top view of the touch unit as a color filter and FIG. 8 is a schematic diagram showing a second surface's top view of the touch unit of the third embodiment. Although the first electrode strips 451, 582 and the second electrode strips 441 in the previous embodiments are made to be strip electrodes aligning along direction X and direction Y respectively, other alternatives may be practical for an embodiment of the invention. For example, for a touch unit 60 in the third embodiment according to the invention, the first direction sensing electrode 65 may be just like the embodiment of FIG. 2 that are disposed on the black matrix 68. The first direction sensing electrode 65 includes a plurality of first electrode strips 651, each first electrode strip 651 including metal wires formed in diamond meshed shape that cover a number of pixel areas 681. Correspondingly, on the second surface shown in FIG. 8, the second direction sensing electrode 64 also includes a plurality of second electrode strips 641, each second electrode strip 641 formed in diamond piecewise shape that covers the areas complementary to what the first electrode strips 651 cover. FIG. 7 shows the complementary configuration of the second electrode strips 641 in dashed lines, wherein the second electrode strips 641 is made of transparent conductive layer such as an Indium Tin Oxide (ITO) layer.

Compared with conventional in-cell or on-cell SITO structure, a single ITO structure requiring configuration of bridge insulation layer, the touch unit in the embodiments of the invention disposes two direction sensing electrodes, respectively representing an X-axis sensor and a Y-axis sensor, on both sides of a substrate of a color filter in the flat panel display. The embodiments of the invention does not need the configuration of the bridge insulation layer and the X-axis sensor and the Y-axis sensor may be made of different materials such as an opaque conductive material (metal material for example) and transparent conductive material (an ITO for example). Also, one direction sensing electrode is disposed in/on the black matrix on one side of the substrate and the other direction sensing electrode is disposed on the other side of the substrate locating farther from the black matrix. The configuration provides a much less thickness for the flat panel display with touch function while the touch function is less interfered by the display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch unit, comprising:
   a substrate having a first surface and a second surface opposite to each other;
   a black matrix disposed on the first surface of the substrate and a plurality of pixel areas is defined by the black matrix;
   a first direction sensing electrode disposed on the black matrix or contained in the black matrix;
   a second direction sensing electrode disposed on the second surface; and
   a color filter layer comprising a plurality of color filter units disposed in the plurality of pixel areas defined by the black matrix, wherein the first direction sensing electrode is disposed between the substrate and the color filter layer.

2. The touch unit of claim 1, wherein the first direction sensing electrode is a metallic electrode and the second direction sensing electrode is a transparent conductive electrode.

3. The touch unit of claim 1, wherein the first direction sensing electrode is disposed on the black matrix and comprises a plurality of first electrode strips aligning along a first direction and parallel with one another, every two adjacent first electrode strips separated by a gap with a first distance and each first electrode strip being a meshed structure.

4. The touch unit of claim 3, wherein the plurality of first electrode strips is composed of a plurality of metal wires with a metal mesh structure.

5. The touch unit of claim 4, wherein the width of each metal wire is less than or equal to the line width of the black matrix where the metal wire is located.

6. The touch unit of claim 4, wherein the width of each metal wire is between 2 μm and 8 μm.

7. The touch unit of claim 3, wherein each first electrode strip has the width that covers at least a row of pixel areas.

8. The touch unit of claim 3, wherein the second direction sensing electrode comprises a plurality of second electrode strips aligning along a second direction and parallel with one another, every two adjacent second electrode strips separated with a second distance.

9. The touch unit of claim 1, wherein the first direction sensing electrode is contained in the black matrix, the black matrix comprising a first anti-reflection layer and a metallic layer, the first anti-reflection layer disposed between the first surface and the metallic layer and the first direction sensing electrode formed by the metallic layer.

10. The touch unit of claim 9, further comprising a second anti-reflection layer disposed between the first anti-reflection layer and the metallic layer.

11. The touch unit of claim 10, wherein the first anti-reflection layer is an oxide layer and the second anti-reflection layer is a nitride layer.

12. The touch unit of claim 9, wherein a plurality of first electrode strips is composed of the black matrix, the first electrode strips aligning along a first direction and parallel with one another and each first electrode strip being a meshed structure.

13. The touch unit of claim 9, wherein every two adjacent first electrode strips are separated by a gap and a portion of the color filter layer disposed on the gap has at least two color filter units overlapping the gap.

14. The touch unit of claim 3, wherein each of the first electrode strips includes metal wires formed in diamond meshed shape covering a number of the pixel areas and each of the second electrode strips formed in diamond piecewise shape covering the areas complementary to what the first electrode strips cover.

15. A flat panel display, comprising:
a display substrate;
a touch unit disposed on the display substrate, the touch unit comprising:
a substrate having a first surface and a second surface opposite to each other;
a black matrix disposed on the first surface of the substrate and a plurality of pixel areas is defined by the black matrix;
a first direction sensing electrode disposed on the black matrix or contained in the black matrix;
a second direction sensing electrode disposed on the second surface; and
a color filter layer comprising a plurality of color filter units disposed in the plurality of pixel areas defined by the black matrix; and
a liquid crystal layer disposed between the touch unit and the display substrate.

16. The flat panel display of claim 15, wherein the first direction sensing electrode is a metallic electrode and the second direction sensing electrode is a transparent conductive electrode.

17. The flat panel display of claim 16, wherein the first direction sensing electrode is disposed on the black matrix and comprises a plurality of first electrode strips aligning along a first direction and parallel with one another, every two adjacent first electrode strips separated by a gap with a first distance and each first electrode strip being a meshed structure.

18. The flat panel display of claim 17, wherein each first electrode strip is meshed structure having line width less than or equal to the line width of the black matrix where the first electrode strip is located.

19. The flat panel display of claim 15, wherein the first direction sensing electrode is contained in the black matrix, the black matrix comprising a first anti-reflection layer and a metallic layer, the first anti-reflection layer disposed between the first surface and the metallic layer and the first direction sensing electrode formed by the metallic layer.

20. The flat panel display of claim 19, wherein a plurality of first electrode strips is formed by the black matrix, the first electrode strips aligning along a first direction and parallel with one another and each first electrode strip being a meshed structure.

21. The flat panel display of claim 20, wherein every two adjacent first electrode strips are separated by a gap and a portion of the color filter layer disposed on the gap has at least two color filter units overlapping the gap.

* * * * *